Aug. 28, 1928.

C. T. PFLUEGER

STRIKER SPOON

Filed Feb. 23, 1926

1,682,711

INVENTOR.
CHARLES T. PFLUEGER
BY
ATTORNEY.

Patented Aug. 28, 1928.

1,682,711

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

STRIKER SPOON.

Application filed February 23, 1926. Serial No. 90,012.

The invention described and shown herein relates to that type of trolling spoon in which a hook is provided which is held in position adjacent the spoon, but which is adapted to be released when a strike occurs so as to securely hook the fish.

By the form of the invention described herein, the hook is secured in position until the strike, whereupon it is released and is then in a position remote from the spoon and flexibly connected thereto so that no leverage or purchase is afforded in the struggles of the fish.

The spoon serves its function as a lure to attract the fish, but as soon as the fish strikes, it is desirable to have the spoon removed as remotely as possible from the scene of action. The construction shown herein meets the requirements stated better than any prior construction known to me. It provides for a flexible connection between the hook and the spoon which gives the fish no leverage or purchase in its struggle to free itself.

The invention has been shown in several forms or modifications, but it will be obvious that when the principles of the invention have been described and shown to those skilled in this art, other forms may be devised without the exercise of invention and within the scope of the appended claim. The invention may be applied to other lures than spoons.

In both forms of the invention, the spoon is indicated at 1, the point of attachment for the line being shown at 2 and the usual swivel at 3. The hook is indicated by the numeral 4, the eye or loop thereof being shown at 5.

Figure 1:
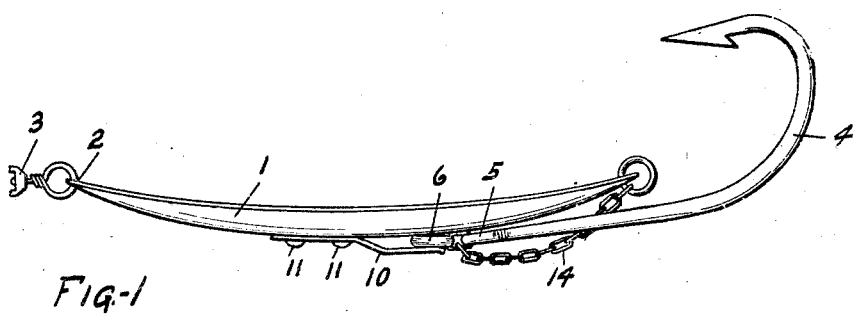
Figure 1 is a side elevation of the improved striker spoon, showing the hook in position as in trolling.
Figure 2:
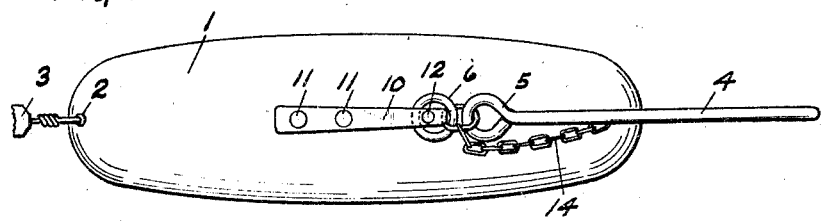
Figure 2 is a view looking at the convex side of the spoon, the parts being in the position shown in Figure 1.
Figure 3:
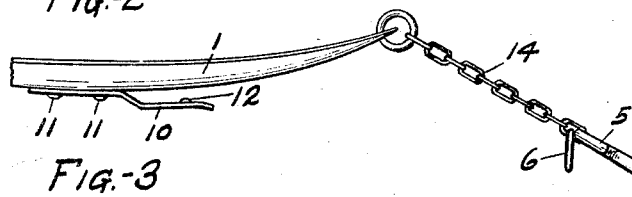
Figure 3 is a view showing the hook released after a strike.

In the form of the invention shown in Figures 1, 2 and 3, the eye of the hook is temporarily and releasably held at a point near the center of the spoon by a flat leaf spring 10 which is riveted to the body of the spoon at 11. The end of the spring is provided with a lug 12 which is adapted to engage a ring 6 on the eye 5 to hold the hook in position for trolling, the point or barb of the hook being adjacent the spoon. A flexible connector, such, for example, as the chain 14 is attached to the lower end of the spoon and to the eye of the hook.

The operation of the device is clearly shown in the drawings. When the fish strikes the hook the ring is instantly released from the spring and the hook leaves the spoon and is held at the far end of the elongated, flexible connector. In this manner the fish is entirely removed from the vicinity of the spoon and is more securely caught than with former constructions which give a purchase or leverage for the fish. The flexible connector gives no point against which the fish may work.

Figure 4:
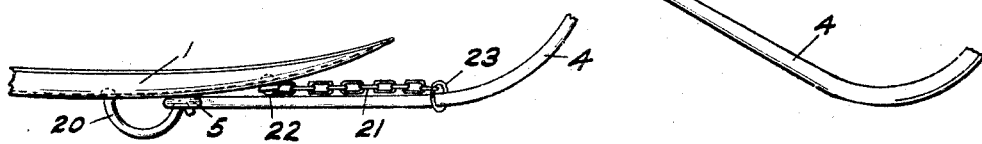
Figure 4 is a modified form of the invention in trolling position.
Figure 5:
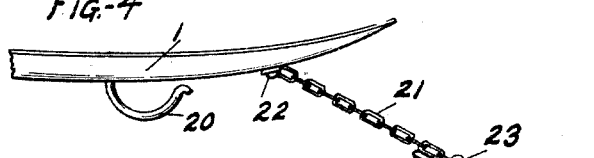
Figure 5 is a view of the same form in released position.

In the form shown in Figures 4 and 5, a slightly different shaped spring catch 20 is shown, which engages the eye of the hook. The chain or flexible connector 21 is attached to the spoon near its lower end by a rivet 22 and the outer end of the chain carries a runner 23 through which the shank of the hook passes, the eye 5 stopping the outward movement of the hook.

Figure 6:
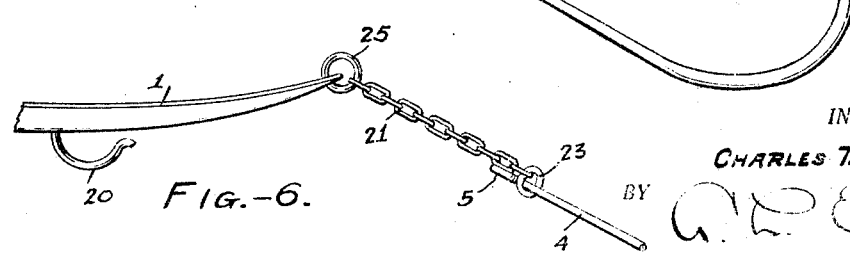
Figure 6 is a view of a further modification.

As a further modification, as shown in Figure 6, the flexible connector 21 may be attached to an eye 25 at the extremity of the spoon rather than by the rivet 22.

In any of the forms of the invention shown, it will be apparent that a superior type of striker spoon has been designed, in which the hook is held adjacent the spoon during trolling and is freely attached to the spoon by the flexible connector. Other designs may be made as embodiments of the invention which are intended to be covered in the appended claim. Any suitable cable or cord may be substituted for the chains and other devices may be suggested for attaching the connector to the hook or the spoon.

What is claimed is:

A fish lure comprising a spoon, a spring catch attached to the spoon, a flexible element also attached to the spoon, a ring on the end of the flexible element, and a fish hook, the shank of which is movable through the ring, the hook being provided with an eye adapted to be engaged by the catch when the hook is adjacent the spoon, and adapted to act as a stop to prevent withdrawal of the hook from the ring.

CHARLES T. PFLUEGER.